May 15, 1951 J. G. KING 2,552,721
COMPOSITE OSCILLATOR AND AMPLIFIER SYSTEM
Filed Aug. 5, 1948
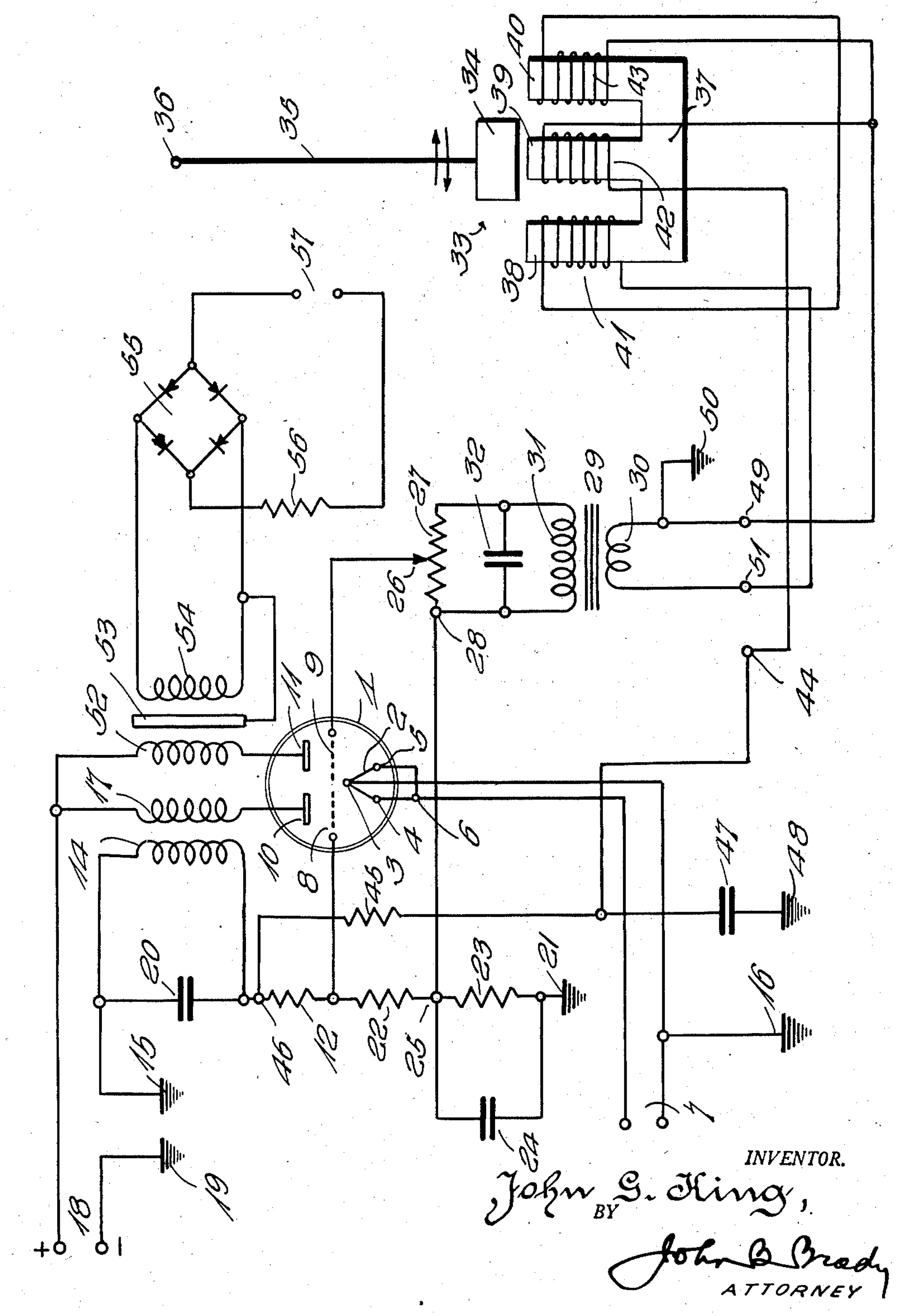
INVENTOR.
John G. King,
BY
John B. Brady
ATTORNEY Patented May 15, 1951

2,552,721

UNITED STATES PATENT OFFICE 2,552,721

COMPOSITE OSCILLATOR AND AMPLIFIER SYSTEM

John G. King, Arlington, Mass., assignor, by mesne assignments, to The Pennsylvania Research Corporation, a corporation of Pennsylvania Application August 5, 1948, Serial No. 42,643

5 Claims. (Cl. 250—36)

My invention relates broadly to electronic circuits and more particularly to a combined oscillator amplifier circuit for use with a variable amplitude pickoff circuit.

One of the objects of my invention is to provide a circuit arrangement for a combined electronic oscillator and amplifier for supplying signal current to a measuring device and determining the output of the measuring device under variable conditions.

Another object of my invention is to provide a composite oscillator and amplifier circuit for use in measuring instruments in which the circuit has a high degree of stability.

A further object of my invention is to provide a composite oscillator and amplifier circuit including a network in the oscillator circuit by which grid bias is derived from the grid current of the oscillator circuit and supplied to the grid circuit of the amplifier for stabilizing the circuit against variations in plate supply voltage.

Still another object of my invention is to provide a composite oscillator and amplifier circuit employing the two halves of a double triode or similar tube for stabilized operation of a measuring instrument.

Other and further objects of my invention reside in the combined oscillator amplifier circuit as set forth more fully in the specification hereinafter following by reference to the accompanying drawing which diagrammatically and schematically shows the composite oscillator and amplifier circuit of my invention applied to an electromagnetic accelerometer.

My invention is directed to an electronic circuit for the simultaneous production of an alternating current signal to be applied to a measuring system and measurement of the output of the measuring system after that system has in some way altered the characteristics of the input signal.

I have developed a modified tuned-plate tuned-grid oscillator circuit for the production of an alternating current electric signal and an amplifier for the amplification of this signal after it has been acted upon by a measuring device.

The circuit combines the function of the two circuits in one double triode or other vacuum tube capable of performing the double function. The oscillator output is fed to a measuring device such as a variable resistance strip, potentiometer, transformer of a variable gain or with variable coupling between primary and secondary, or other similar device, the output of which is a function of the variable quantity being measured. The output of the measuring device is returned to the grid of the amplifier section of the tube. The output of the amplifier may then be rectified by an instrument-type dry rectifier for application to a direct current galvanometer or other indicating or recording device.

Another part of the invention consists of the network for stabilizing the amplifier against variations in B-supply voltage. This function is accomplished by deriving the grid bias voltage of the amplifier section of the tube from the grid current drawn by the oscillator section.

The circuit is capable of being assembled in very compact form by utilizing a miniature or sub-miniature tube and miniature transformers for input and output coupling, provided power requirements are not such that heavier components are necessary. If the latter case holds, the circuit may be built of components with higher power ratings.

Referring to the drawings in more detail reference character 1 designates a double triode of the type such as 3A5 for example, containing a cathode 2 having a midtap 3 therein with connections brought out from opposite terminals of the cathode at 4 and 5 and from the midtap 3. The opposite terminals of the cathode are connected together as indicated at 6. The cathode supply is furnished from a 1.4 volt source connected at 7 to leads brought out from the center midtap 3 and from the connection 6 that connects to opposite ends of the cathode at 4 and 5. The tube 1 includes separate grid electrodes 8 and 9 and separate associated plate electrodes 10 and 11. The electrodes constituted by cathode 2, grid electrode 8 and plate 10 are associated as an oscillator system. The oscillation circuit is completed by a connection forming an input circuit leading from grid electrode 8 through resistor 12 and inductance 14 to ground 15, returning through ground connection 16 to the cathode 2. The output circuit of the oscillator is completed from plate electrode 10 through inductance 17 that is coupled with inductance 14 and connected to the positive plate terminal of the supply source 18. The negative side of the plate supply source 18 connects to ground 19. The output circuit is completed through ground 16 leading to cathode 2.

Inductance 14 is shunted by tuning condenser 20. A high resistance path is connected across the grid electrode 8 and the ground at 21, this path being constituted by resistors 22 and 23 arranged in series. A by-pass condenser 24 is connected in shunt with resistor 23. Resistors 22 and 23 constitute a potentiometer having a central tap 25 which is employed for securing the grid bias for the amplifier section of the tube 1. Cathode 2, grid electrode 9, plate electrode 11, comprise the electrodes of the amplifier section. The amplifier section of tube 1 includes grid electrode 9 connected to an input circuit through variable tap 26 on potentiometer 27, the end terminal of which at 28 connects to the biasing tap 25. Variable current is supplied to the input circuit of the amplifier through iron core transformer system 29 having a primary winding 30 and secondary winding 31 inductively associated therewith. Secondary winding 31 is shunted by fixed condenser 32. A selected bias potential is applied to grid electrode 9 of the amplifier section of tube 1 from tap 25 on the potentiometer constituted by resistors 22 and 23 connected across the input circuit of the oscillator section of the tube, the circuit being completed through terminal 28 of potentiometer 27 and the variable tap 26 thereon. Variable currents are impressed upon grid electrode 9 of the amplifier section of the tube 1 from the secondary winding 31 of transformer system 29. Potentiometer 27 connected in shunt with the secondary winding 31 and the variable tap 26 thereon connects to the grid electrode 9 for simultaneously supplying variable currents to grid electrode 9 as well as the grid potential secured from tap 25 on the potentiometer in the input circuit of the oscillator portion of the tube 1.

In the application of my invention herein illustrated, I have shown an accelerometer 33 arranged for impressing variable current upon the input circuit to the amplifier section of the tube. The accelerometer comprises a suspended magnetic mass 34 suspended by spring strip 35 depending from the point of support 36 on the mobile body on which the accelerometer is installed. The magnetic mass 34 is displaceable in a linear direction with the point of support 36 as a pendent suspension across the E-shaped core structure represented at 37 formed by magnetic laminations having upstanding legs 38, 39 and 40 constituting parts of the E. Electromagnetic winding 41 is wound on magnetic leg 38; electromagnetic winding 42 is wound on magnetic leg 39; and electromagnetic winding 43 is wound on magnetic leg 40. Magnetic windings 41 and 43 are so phased with respect to each other and electrically connected in series with each other that so long as the magnetic circuit linking the center excited coil 42 and the two symmetrically located measuring coils 41 and 43 is balanced and symmetrical, no voltage is induced in the measuring coils. The center excited coil 42 is connected in the oscillator section of the double triode 1 through terminal 44 which connects to the input circuit of the oscillator through resistor 45 which connects to tap 46 leading to the input circuit of the oscillator section that contains tuned circuit formed by inductance 14 and capacity 20. The connection of the exciting winding 42 to the input circuit of the oscillator section of the tube is isolated through condenser 47 which connects to ground 48. The other terminal of the exciting coil 42 connects to terminal 49 with ground 50 through which a return path to the input circuit of the oscillator is provided through ground connection 15. The output circuit of the accelerometer which includes windings 41 and 43 connects to terminals 49 and 51 leading to primary winding 30 of transformer system 29 by which variable current is impressed upon the input circuit to the amplifier. Only a small unbalance of the accelerometer caused by displacement of magnetic mass 34 is required to produce a comparatively large output voltage that is supplied to the amplifier section of tube 1.

The output of the amplifier section of tube 1 leading from plate electrode 11 includes inductance 52 connected to the positive side of plate supply voltage 18, the negative side of which is connected to ground 19. Inductance 52 in the output circuit of the amplifier section of tube 1 is wound in an opposite sense to inductance 17 in the output circuit of the opposite section of the tube. Inductance 52 constitutes the primary winding of an iron core output transformer system 53 having a secondary winding 54 which connects to a balanced rectifier circuit represented at 55. The balanced rectifier circuit 55 connects through resistor 56 to output terminals 57 to connect to a direct current galvanometer or other indicating or recording device at terminals 57.

In the operation of the composite oscillator and amplifier system I have found the following values of the circuit components highly practical:

Resistor 12=1.5 megohms
Resistor 22=3 megohms
Resistor 23=2 megohms
Condenser 24=.05 mfd.
Condenser 20=.03 mfd.
Resistor 45=30 megohms
Condenser 47=.05 mfd.
Potentiometer 27=1.0 megohms
Condenser 32=.100 mfd.
Resistor 56=25 ohms
Winding 41=300 turns
Winding 42=1000 turns
Winding 43=300 turns In setting forth the foregoing values I do not intend to limit my invention to the values noted but am merely setting forth these values for the purpose of explaining one application of my invention.

The oscillator section comprising cathode 2, grid electrode 8, and plate 10 develops a 2½ kc oscillating voltage that is impressed upon the center winding 42 of the accelerometer. Displacement of mass 34 causes an unbalance in the magnetic system introducing a variable voltage in windings 41 and 43 that is impressed through transformer system 29 upon the input circuit of the amplifier 1. The bias for the grid electrode 9 of the amplifier section of tube 1 is derived from tap 25 in the potentiometer circuit 22—23 of the oscillator section of tube 1 that is biasing current for the amplifier is obtained from the voltage developed by the oscillator grid current. Oscillations are developed in the oscillator section of tube 1 by the coupled relation of input and output inductances 14 and 17, respectively. The electron discharge path from cathode 2 within tube 1 to the sets of oscillator electrodes 8—10 and the sets of amplifier electrodes 9—11 insures stability of the system as the variations from the accelerometer results in changes in electron discharge, both in the amplifier section as well as in the oscillator section. Simultaneously, with changes in the oscillator circuit current the potential at bias point 25 changes and correspondingly controls the bias on the amplifier grid electrode 9.

While I have described by invention in a certain preferred embodiment I realize that modifications may be made and I desire that it be understood that no limitations upon my invention are intended other than may be imposed by the scope of the appended claims.

What I claim as new and desire to secure by Letters Patent of the United States is as follows:

1. A combined oscillator and amplifier system comprising an electron tube having a common cathode and sets of grid and plate electrodes associated therewith, an oscillator input circuit associated with said common cathode and one of said grid electrodes, an oscillator output circuit associated with said common cathode and the plate electrode associated with said last mentioned grid electrode, an amplifier input circuit connected with said common cathode and said other grid electrode, an amplifier output circuit associated with said common cathode and the plate electrode associated with said last mentioned grid electrode, means for introducing a variable signal current into said amplifier input circuit including a multiplicity of magnetic pole members, an electromagnetic winding individual to each of said magnetic pole members, a pendently supported magnetic mass suspended over said pole members and displaceable linearly with respect to the ends of said pole members, connections from one of said electromagnetic windings with said oscillator output circuit and connections from another of said electromagnetic windings with said amplifier input circuit, a signal output circuit associated with said amplifier output circuit, and means for deriving bias potential for said amplifier input circuit wholly developed by current from said oscillator input circuit.

2. A combined oscillator and amplifier system comprising an electron tube having a common cathode and sets of grid and plate electrodes associated therewith, an oscillator input circuit associated with said common cathode and one of said grid electrodes, an oscillator output circuit associated with said common cathode and the plate electrode associated with said last mentioned grid electrode, an amplifier input circuit connected with said common cathode and said other grid electrode, an amplifier output circuit associated with said common cathode and the plate electrode associated with said last mentioned grid electrode, means for introducing a variable signal current into said amplifier input circuit comprising a plurality of magnetic pole members, an electromagnetic winding individual to each of said magnetic pole members, a pendently supported magnetic mass suspended over said pole members and displaceable linearly with respect to the ends of said pole members, connections from one of said electromagnetic windings with said oscillator output circuit and connections from another of said electromagnetic windings with said amplifier input circuit, a signal output circuit associated with said amplifier output circuit, a potentiometer circuit connected across said oscillator input circuit, a tap in said potentiometer circuit, and a connection from said tap to the amplifier input circuit for impressing bias potential on the last mentioned grid electrode.

3. A combined oscillator and amplifier system comprising an electron tube having a common cathode and sets of grid and plate electrodes associated therewith, an oscillator input circuit associated with said common cathode and one of said grid electrodes, an oscillator output circuit associated with said common cathode and the plate electrode associated with said last mentioned grid electrode, an amplifier input circuit connected with said common cathode and said other grid electrode, an amplifier output circuit associated with said common cathode and the plate electrode associated with said last mentioned grid electrodes, means for introducing a variable signal current into said amplifier input circuit including a multiplicity of magnetic pole members, an electromagnetic winding individual to each of said magnetic pole members, a pendently supported magnetic mass suspended over said pole members and displaceable linearly with respect to the ends of said pole members, connections from one of said electromagnetic windings with said oscillator output circuit and connections from another of said electromagnetic windings with said amplifier input circuit, a signal output circuit associated with said amplifier output circuit, and means for electromagnetically coupling said oscillator input and output circuits for sustaining oscillations through said common cathode and said first mentioned set of grid and plate electrodes.

4. A combined oscillator and amplifier system comprising an electron tube having a common cathode and sets of grid and plate electrodes associated therewith, an oscillator input circuit associated with said common cathode and one of said grid electrodes, an oscillator output circuit associated with said common cathode and the plate electrode associated with said last mentioned grid electrode, an amplifier input circuit connected with said common cathode and said other grid electrode, an amplifier output circuit associated with said common cathode and the plate electrode associated with said last mentioned grid electrode, means for introducing a variable signal current into said amplifier input circuit including a plurality of magnetic pole members, an electromagnetic winding individual to each of said magnetic pole members, a pendently supported magnetic mass suspended over said pole members and displaceable linearly with respect to the ends of said pole members, connections from one of said electromagnetic windings with said oscillator output circuit and connections from another of said electromagnetic windings with said amplifier input circuit, a signal output circuit associated with said amplifier output circuit, an inductance arranged in said oscillator input circuit, and an inductance arranged in said oscillator output circuit, said inductances being mutually magnetically coupled.

5. A composite oscillator and amplifier comprising an electronic system including an oscillator section and an amplifier section, each of said sections including a source of electrons, a grid and a plate, a potentiometer circuit connected with said oscillator section, a variable amplitude pickoff device including an E-shaped magnetic core structure having spaced vertically disposed legs one of which is central and the other of which are symmetrically disposed relative thereto, an exciting winding on said central leg and output windings on said symmetrically disposed legs, a magnetic mass suspended over the vertically disposed legs of said magnetic core structure for relative displacement with respect thereto, connections extending from said oscillator section to said exciting winding, connections extending from said output windings to the input of sai damplifier section and a connection from said potentiometer circuit in said oscillator section to the grid of said amplifier section for impressing bias potential thereon.

JOHN G. KING.

REFERENCES CITED

The following references are of record in the file of this patent:

UNITED STATES PATENTS

| Number | Name | Date |
|---|---|---|
| 2,066,333 | Caruthers | Jan. 5, 1937 |
| 2,361,738 | Bird | Oct. 31, 1944 |
| 2,461,306 | Antalek | Feb. 8, 1949 |
| 2,505,577 | Rich | Apr. 25, 1950 |